Figure 1:
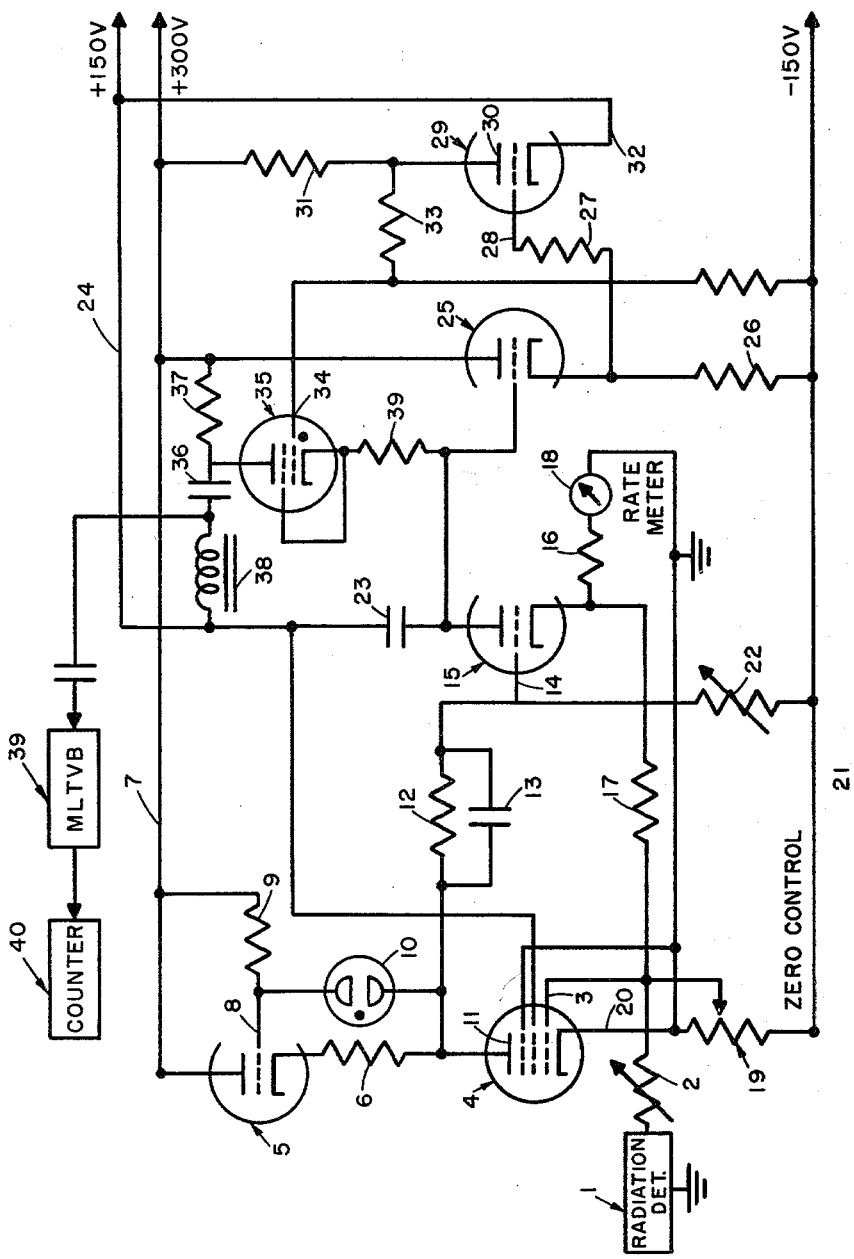

Leon Bess
INVENTOR.

United States Patent Office 3,185,844
Patented May 25, 1965

3,185,844
RADIATION DOSIMETER CIRCUIT
Leon Bess, 1706 Jonquil Terrace, Apt. 3G, Chicago, Ill.
Filed Sept. 19, 1961, Ser. No. 139,238
10 Claims. (Cl. 250—83.3)

The present invention relates generally to the apparatus for monitoring radiation levels and, more particularly, to a dosimeter for indicating, for example, the rate at which electromagnetic or nuclear radiation is being absorbed by an individual in a radiation environment and the accumulated dosage received by such a person during a given time interval.

In the treatment of certain ailments by radiation therapy, it is essential that the radiologist continuously monitor both the rate of entry of the radiation into the patient and the total amount of radiation he absorbs during the treatment program. Because even a brief exposure to intense levels of radiation can produce harmful biological results, the concentration of the irradiation must never exceed predetermined levels. However, the level that is permissible at any particular time can vary considerably for it depends upon such factors as the nature of the irradiating energy, since electromagnetic and nuclear radiations react differently on the human body, and the radiosensitivity or radioresistivity of the tissue or organ being treated. Moreover, since the effects of radiation are cumulative, repeated and prolonged exposure to what otherwise may be a tolerable level of radiation can also produce permanent biological damage. Therefore, the radiologist must carefully monitor the intensity of the irradiating energy and maintain a record of the total dosage absorbed by each patient during any one exposure or series of exposures.

Instruments for indicating the extent of radiation exposure are known in the prior art, and these instruments are sometimes called "dosimeters." However, the dynamic range of these devices is usually somewhat limited and, consequently, their use in radiation therapy is restricted because of the diverse levels of radiation encountered therein.

Also, it is sometimes convenient to have the total radiation dosage received by an individual available in the form of a numeral quantity. Prior art dosimeters usually cannot be used with high speed pulse counters to register such and indication since they employ mechanical components in their circuits which possess relatively slow response times.

The need for monitoring radiation levels is also encountered in such other fields as metallurgy, where electromagnetic beams probe the integrity of castings; in nuclear physics, where high speed subatomic particles investigate the composition and structure of materials; and in reactor engineering, where the fuel elements have radioactive properties.

It is accordingly a primary object of the present invention to provide a dosimeter which gives an accurate indication of both the rate at which an individual is absorbing radiation and the total dosage received by such an individual during a given time interval.

Another object of the present invention is to provide a dosimeter wherein the output takes the form of a pulse train whose repetition rate depends upon the intensity of the radiation being monitored.

A still further object of the present invention is to provide a radiation monitoring device of the type wherein the accumulated radiation exposure is registered as a numerical count on a high speed pulse counter.

A still further object of the present invention is to provide a dosimeter having relatively wide dynamic range.

A still further object of the present invention is to provide a dosimeter which can operate a high speed pulse counter to give a numerical indication of the radiation dosage absorbed during a given time interval.

A still further object of the present invention is to provide a dosimeter whose range can be changed by merely switching into the circuit resistance and capacitance elements of different magnitudes.

A still further object of the present invention is to provide an infinite time integrating circuit of the type wherein the total number of pulses developed by the circuit during a given time interval corresponds to the integral of a unidirectional variable amplitude input signal taken over the same interval.

Figure 2:
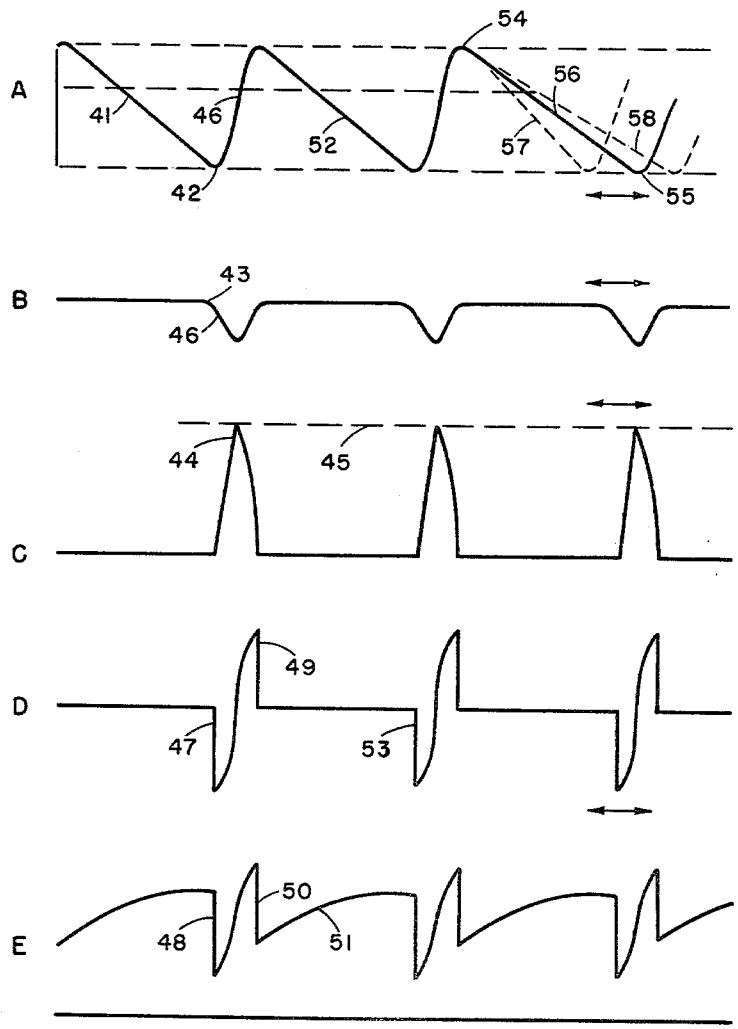

Other objects and many of the attendant advantages of this invention will be readily appreciated as the same becomes better understood by reference to the following detailed description when considered in connection with the accompanying drawings wherein:

FIG. 1 is a schematic diagram of the preferred embodiment of the present invention; and FIG. 2 illustrates some of the wave forms appearing at selected points in this circuit as the dosimeter monitors a particular level of radiation.

Referring now to FIG. 1 which schematically illustrates a preferred embodiment of the present invention, a conventional radiation detector 1, which may take the form of an ionization chamber designed to produce a unidirectional voltage, the magnitude of which is related to the intensity of the illuminating electromagnetic or nuclear radiation, has its output directly fed via variable resistor 2 to the control grid 3 of a normally conducting pentode 4 connected in a high gain D.C. amplifying configuration. To realize this mode of operation, the load connected in the anode circuit of this tube includes a triode 5 in series with resistance 6. Both tubes derive their operating potential from a relatively high, positive voltage source 7 which may be of approximately 300 volts. The control grid 8 of triode 5 is connected to this source by resistance 9, and a voltage stabilizing device in the form, for example, of a neon tube 10 is connected in the grid cathode circuit of this tube between control grid 8 and the anode 11 of pentode 4. It will be appreciated that triode 5, along with neon tube 10, forms a load resistance for pentode 4 having a low static but high dynamic value. Because of this, pentode 4 operates as a D.C. amplifying stage with a high gain characteristic.

It would be pointed out, also, that the design of the first D.C. amplifying stage, described above, is of no critical importance to the operation of the system and that any conventional circuit or combination of stages can be employed. The use of a single, high gain stage is preferred, of course, since it minimizes oscillation and stabilization problems.

The input signal derived from the radiation detecting circuit, as mentioned hereinbefore, is directly applied to the first D.C. amplifying stage as a negative, unidirectional voltage of variable amplitude. This signal drives pentode 4 towards nonconduction and produces as a consequence a positive going voltage wave form in its anode circuit which is directly coupled via resistance 12, parallelled with a bypass capacitor 13, to the control grid 14 of triode 15. This triode performs as a second D.C. amplifying stage, and the positive signal developed across resistance 16 in its cathode circuit is fed back via resistance 17 as a negative feedback signal to the control grid 3 of pentode 4. It will be appreciated that pentode 4 and triode 15 with their associated circuits constituted a high gain D.C. amplifier with a negative fedeback feature. Because of the latter provision, the voltage appearing across cathode resistor 16 will always be almost exactly proportional to the voltage impressed on the input circuit from the radiation detecting apparatus. Hence, the instantaneous level of the radiation illuminating the detecting apparatus can be ascertained by inserting an ammeter 18 in series with cathode resistor 16 and monitoring the magnitude of the current flowing through this indicator.

A potentiometer 19 is connected between the grounded cathode 20 of pentode 4 and a negative potential source 21 which may have a magnitude of approximately 150 volts. By adjusting the movable tap of this potentiometer which is connected to the control grid 3 of pentode 4, the zero setting of rate meter 18 can be readjusted from time to time to compensate for the slow drifts normally present in D.C. amplifying circuits. Variable resistance 2 is included in the input circuit to permit the fractional relationship between the magnitude of the voltage developed across cathode resistance 16 and the input voltage to be varied for different ranges of illuminating radiation. It will be readily seen that this resistance determines the magnitude of the current flow through that portion of potentiometer 19 which is between ground and the moveable tap and, consequently, the voltage available in the input circuit of pentode 4 for a given level of illuminating radiation.

Triode 15, the second D.C. amplifying tube, is normally maintained at the threshold of conduction by the bias applied to its control grid 14 from source 21 via variable resistance 22. A storage capacitor 23 is connected between the anode 23 and a positive voltage source 24 which may be in the order of 150 volts. It will be appreciated, of course, that the rate at which charging current flows into this storage capacitor from the above voltage source will depend primarily upon the impedance of triode 15 as established by the magnitude of the signal present at its control grid 14. Since this signal is proportionally related to the level of the illumination radiation, this charging current, which also flows through meter 18, will likewise vary in accordance with the intensity of this radiation. This relationship is employed in the system to provide a basis for timing the generation of successive output pulses, as will be seen hereinafter.

Following this second D.C. amplifying stage is a cathode follower stage 25, and the output thereof which appears across its cathode resistor 26 is coupled via resistance 27 to the control grid 28 of a triode 29. The cathode follower stage is included in the system to prevent any loading on storage capacitor 23 since, as mentioned hereinbefore, this capacitor serves as the timing element for the dosimeter circuit.

Triode 29 has its anode 30 connected to the higher positive operating potential 7 and its cathode 32 directly connected to the lower positive potential 24. This triode is normally biased sufficiently positive by the voltage appearing across cathode resistor 26 to draw grid current and, as a consequence, in the standby state of operation its anode potential is maintained at its lowest magnitude.

Anode 30 of triode 29 is also connected via resistance 33 to the control grid 34 of a thyratron tube 35. This thyraton, when fired, provides a low impedance discharge path for a storage capacitor 36 which is connected in series with load resistor 37 and inductance 38 across sources 7 and 24. It would be mentioned at this time that inductance 38 is included in the loop circuit formed by capacitor 36, thyraton 35, its cathode resistor 39 and storage capacitor 23 to form a pulse in response to each firing of the thydatron and the accompanying discharge of capacitor 36. The pulse so formed is coupled from the junction of capacitor 36 and inductance 38 to a conventional multivibrator 39 for shaping purposes and, thereafter, it is passed to pulse counter 40, which registers a count indicative of the total number of pulses produced in the system during a given counting period.

The operation of the system of FIG. 1 may be described as follows. In the standby condition, that is, with no significant radiation illuminating detector element 1, the D.C. amplifier circuit, including pentode 4 and triode 5, has no appreciable signal fed thereto. Actually, of course, there must always be some current flowing through triode 15 or else it will not amplify. However, at the zero signal condition, this current is relatively low and the counting rate at this time falls well within a 0.1% of the counting speed experienced with an average input signal. It would be noted, of course, that the higher the gain of the D.C. amplifier combination the lower the zero signal current can be. Because of the zero signal, thyratron 35 may be periodically fired and pulses may appear from time to time at the output of multivibrator 39. However, these pulses will have a relatively great interpulse spacing and be readily recognized as those representing a standby mode of operation. This condition can also be readily ascertained by monitoring the reading of rate meter 18.

However, as soon as a negative input signal appears at the control grid 3 of pentode 4, signifying the presence of ionizing radiation, a positive voltage forms at the anode 11 of this tube, and this signal is directly coupled to control grid 14 of triode 15 to institute conduction therein. As mentioned hereinbefore, the negative feedback path established by resistance 17 insures that the voltage produced across cathode resistor 16 maintains a magnitude proportionally related to that of the input signal. Hence, the current registered by rate meter 18 at this time indicates the instantaneous level of the illuminating radiation.

With triode 15 conducting, charging current commences to flow into storage capacitor 23 from source 24, and the anode potential of this triode, as shown by wave form A in FIG. 2, decreases linearly at a rate proportional to the magnitude of the illuminating radiation. The magnitude of the negative slope 41 establishes the pulse repetition rate of the system, as will be seen hereinafter. Charging current continues to flow into capacitor 23, and the anode potential continues to fall until a point 42 is reached whereat the negative going signal coupled to the input of the cathode follower stage 25 lowers the cathode voltage of this stage to a level insufficient to maintain the flow of grid current in triode 29. Wave form B, which represents the voltage at the control grid 28 of triode 29, indicates at point 43 the time at which this triode stops drawing grid current. When this takes place, a positive pulse, as shown in wave form C, having a steep leading edge 44 appears at anode 30, and this signal triggers thyratron 35 when it reaches point 45.

It would be pointed out at this time that the positive slope of wave form 44 is considerably greater than that of the negative wave form 46 established by the charging rate of capacitor 23. This comes about because of the amplification factor of triode 29. Because of this relationship, the time at which thyratron 35 fires is determined primarily by the point 43 at which triode 29 stops drawing grid current. This means, in effect, that any variations in the level of the firing voltage do not substantially influence the time at which the thyratron fires in any one cycle. These variations merely show up as very small time displacements in the pulse train and do not materially affect the pulse repetition rate.

When thyratron 35 is fired, it completes a low impedance discharge path for storage capacitor 36, previously fully charged by current flowing from source 7 through load resistor 37, inductance 38, to voltage 24. When storage capacitor 36 discharges, it, in effect, "dumps" a determined fraction of its charge into storage capacitor 23, thereby raising the anode voltage of triode 15 to the level it originally had when the cycle first commenced. This increase in anode potential corresponds to the positive slope portion 46 of wave form A. The time duration of the discharge should be a small fraction of the maximum repetition rate interval since it gives rise to an eror in the true repetition rate. The discharge action also develops a negative pulse 47 across inductance 38, as shown in wave form D taken at the input to multivibrator 39. The potential at the anode of thyratron 35, shown by wave form E, experiences a sudden drop at this time, as shown by reference character 48. This represents the moment at which conduction is established in this tube. The positive peaks, 49 in wave form D and 50 in wave form E, come about as a consequence of the behavior of inductance 38, as is well known. These transitory peaks are quickly dissipated and have no effect upon the operation of the system. Thyratron 35 is self-quenching, that is, it is turned off by the operation of the discharge circuit described above since this circuit attempts to, so to speak, "push" a negative current through it.

With thyratron 35 now extinguished, capacitor 36 once again charges to its original voltage through resistor 37, which in the present case is 150 volts. As this charging current falls off, the anode potential of thyratron 35 increases along line 51. Meanwhile, charging current again flows into storage capacitor 23 from source 24, reducing the anode potential of triode 15 along line 52 until triode 29 stops drawing grid current for a second time. It will be recognized without further discussion that this results in thyratron 35 being fired a second time and the production of the second pulse 53 in the pulse train shown by wave form D. The cycle of events above described continues at the same speed, provided the input signal maintains the same amplitude. Any increase or decrease from this level will immediately show up as a recognizable change in the pulse repetition rate.

From a consideration of the above sequence of operations, it will be readily seen that the interpulse spacing between, for example, pulses 47 and 53 in line D of FIG. 2, corresponds to the time required for the plate voltage of triode 15 to vary over a fixed range defined, for example, by points 54 and 55 in wave form A. The time required for this transit is, of course, directly established by the rate at which charging curent flows into storage capacitor 23. Since this rate is set in accordance with the amplitude of the input signal and indirectly by the amplitude of the illuminating radiation, the pulse rate, therefore, depends upon the rate of radiation being monitored. For example, if the input signal increases, indicating a higher level of radiation, then the negative slope 56 in wave form A increases to 57 and triode 29 stops drawing grid current at an earlier point. Hence, the firing of thyratron 35 is accelerated and the spacing between output pulses decreases so that a higher count is registered by pulse counter 40 for a given period of time. Likewise, if the input signal level decreases, signifying a reduction in the radiation intensity, the charging current into storage capacitor 23 also decreases and the anode potential of triode 15 falls off along line 58. This will prolong the firing of thyratron 35 and increase the interpulse spacing so that counter 40 registers a lower count for a corresponding time interval.

It will be readily seen that the number of times thyratron 35 fires over a relatively large time interval will be a precise measure of the integral of the input voltage taken over the same period. Consequently, the counter 40, which effectively registers each firing, indicates the cumulative radiation dosage absorbed by the individual during any given exposure or series of exposures.

It would be pointed out in connection with the above system that multivibrator 39 is included merely to improve the wave form developed across inductance 38 and that this wave shaping function can be accomplished by any well-known circuit including a conventional amplifier. Additionally, it would be mentioned that the range of the dosimeter can be altered by simply changing the values of capacitors 23 and 36 and resistors 2 and 16. In one practical embodiment of the present invention, a dynamic rate range of 2R./min. to approximately 500R./min. was realized with an accuracy of approximately 0.1%. Furthermore, since the dosimeter circuit above described has no moving parts and can operate at high counting rates, this range can be appreciably extended with electronic counters from 1R./min. to 2,000R./min.

Obviously many modifications and variations of the present invention are possible in the light of the above teachings. It is therefore to be understood that within the scope of the appended claims the invention may be practiced otherwise than as specifically described.

What is claimed is:

1. In a dosimeter circuit for providing an indication of the radiation level within a given environment, the combination of a radiation detector disposed within said environment and developing a unidirectional signal voltage the amplitude of which is proportional to the intensity of the illuminating radiation, a first storage capacitor, means for charging said first storage capacitor from a first to a second level at a rate determined by the amplitude of said signal voltage, a second storage capacitor, means for charging said second storage capacitor to a given level, means operative when the charge across said first storage capacitor reaches said second level for transferring part of the charge of said second storage capacitor to said first storage capacitor so as to reduce the charge thereacross to said first level whereby the voltage across said first storage capacitor has a saw-tooth appearance, and means for indicating the number of saw-tooth wave forms appearing across said first storage capacitor during a given period whereby a measure of the radiation level is obtained.

2. In a system for providing a numerical indication of the total radiation absorbed by an object in a radiation environment during a given time, a radiation detector, said detector being positioned in said environment and producing a unidirectional output signal whose amplitude is proportionally related to the instantaneous intensity of the irradiating energy, a storage capacitor, means for charging said storage capacitor from a first level to a second level at a rate determined by the amplitude of said output signal, means for indicating the rate at which said storage capacitor is being charged, means for rapidly reversedly charging said storage capacitor back to said first level whenever the charge thereacross reaches said second level, and means for registering the number of times said storage capacitor charges to said second level and is reversedly charged back to said first level during a given time interval so as to provide a numerical indication of the radiation absorbed during said time interval by an object positioned in the radiation environment.

3. A radiation monitoring system comprising, in combination, a radiation detector, said detector being of the type that develops a unidirectional voltage the magnitude of which is proportional to the instantaneous intensity of the radiation illuminating said detector, a first storage capacitor, means for charging said first storage capacitor from a first to a second level at a rate which is directly proportional to the amplitude of said voltage, a second storage capacitor, means for charging said second storage capacitor to a given voltage level, means operative when the charge across said first storage capacitor attains said second level for discharging said second capacitor into said first storage capacitor thereby to lower the charge thereacross from said second level to said first level, the time constant of the charging and discharging path of said second storage capacitor being a small fraction of the time constant of the charging path of said first storage capacitor even when said first storage capacitor is charging at a maximum rate, and means for producing an output pulse each time said second storage capacitor discharges into said first storage capacitor whereby the total number of said output pulses generated within a given time interval provides an indication of the level of the radiation illuminating said detector.

4. In a dosimeter circuit for providing an indication of the radiation level within a given location, the combination of a radiation detector positioned within said location and being responsive to said radiation, said detector being of the type which develops a unidirectional output voltage the amplitude of which is proportionally related to the instantaneous intensity of the radiation illuminating it, a first storage capacitor, a second storage capacitor, means for repeatedly charging said first storage capacitor from a first level to a second level at a rate determined by the instantaneous amplitude of the unidirectional signal developed by said radiation detector, and means including said second storage capacitor and a series connected thyratron tube for repeatedly reducing the charge across said first storage capacitor from said second level back to said first level whereby a saw-tooth wave form exists across said first storage capacitor whose period changes in accordance with variations in the instantaneous intensity of the illuminating radiation, means for generating an output pulse each time the charge across said first storage capacitor is reduced from said second level to said first level, and means for counting the number of output pulses generated during a given time interval.

5. In a dosimeter circuit for providing an indication of the radiant energy level within a given environment, the combination of a radiation detector located within said environment and being responsive to said radiant energy, said detector generating a unidirectional signal voltage the magnitude of which is proportional to the instantaneous intensity of said radiant energy, a two-stage D.C. amplifier having a negative feedback loop, means for coupling said signal voltage to the first stage of said two-stage D.C. amplifier, a first storage capacitor, said first storage capacitor being located in the second stage of said two-stage D.C. amplifier so as to be charged from a first to a second level at a rate proportional to the amplitude of the output signal developed by said amplifier, a second storage capacitor, means for charging said second storage capacitor to a given level, means operative whenever the charge across said first storage capacitor attains said second level for discharging said second storage capacitor into said first storage capacitor whereby the charge across said first storage capacitor is quickly reduced to said first level, means positioned in the discharge path of said second storage capacitor for generating an output pulse in response to each discharge of said second storage capacitor, and means for counting the number of output pulses generated within a given time interval.

6. In a dosimeter system for providing a numerical indication of the radiation dosage absorbed by an object in a radiant environment, the combination of a radiation detector positioned in said environment and responsive to said radiant energy, said detector developing a unidirectional output signal whose amplitude is proportional to the instantaneous intensity of said radiant energy, a D.C. amplifier, means for coupling said signal voltage to the input of said D.C. amplifier, a current meter, said current meter measuring the current drawn by said D.C. amplifier and providing an indication of the rate at which said object is absorbing radiation, a first storage capacitor, said first storage capacitor serving as a load for said D.C. amplifier and adapted to be charged from a first to a second level at a rate determined by the amplitude of the current drawn by said D.C. amplifier, means responsive whenever the charge across said storage capacitor attains said second level for rapidly decreasing the charge thereacross back to said first level, said means including a second storage capacitor, means for charging said second storage capacitor to a given level and a thyratron switching tube for completing a discharge path from said second storage capacitor to said first storage capacitor when fired, and means for indicating the number of times said second storage capacitor discharges within a given time interval, said number providing an indication of the radiation dosage absorbed by said object during said time interval.

7. In a dosimeter circuit for providing an indication of the radiation dosage absorbed by an object located in a radiant environment, the combination of a detector, said detector being positioned in said environment so as to be illuminated by the radiant energy and developing a unidirectional output signal the amplitude of which is proportional to the instantaneous intensity of the radiant energy, a vacuum tube having at least an anode, control grid and cathode, a first resistor and a current meter in series between said cathode and a reference potential, a first storage capacitor, said storage capacitor being connected between said anode and a voltage positive with respect to said reference level, means for coupling the unidirectional output signal from said detector to the control grid of said vacuum tube whereby said first storage capacitor is charged from a first level to a second level at a rate proportional to the intensity of the illuminating radiation, a second storage capacitor, a thyratron, said second storage capacitor and said thyratron being in series across said first storage capacitor, means for charging said second storage capacitor to a given level, a cathode follower stage coupled to the anode of said vacuum tube, a triode, said triode being coupled to the cathode resistor of said cathode follower stage so as to be biased to grid conduction until said first capacitor reaches said second level of charge, means for coupling said thyratron to the anode of said triode whereby said thyratron is triggered to conduction by the positive going wave form developed at the anode of said triode when said triode stops drawing grid current, said thyratron when fired permitting said second capacitor to discharge into said first capacitor to thereby lower the charge from said second level back to said first level, means for producing an output pulse for each discharge of said second storage capacitor, and means for counting the number of output pulses so produced during a given time interval.

8. In a dosimeter circuit for providing a numerical indication of the total radiation absorbed by an object in a radiant energy environment during a given time, a detector sensitive to said radiation and producing a unidirectional voltage whose amplitude is proportionally related to the instantaneous intensity of said radiation, a first capacitor, means for charging said first capacitor from a first level to a second level at a rate determined by the amplitude of said voltage, a second capacitor, means for charging said second capacitor to a given level within a time interval short compared to the time required for said first capacitor to attain said second level when charging at its maximum rate, means operative whenever the charge across said first capacitor reaches said second level for discharging said second capacitor into said first capacitor so as to reduce the charge thereacross back to said first level, said means including a thyratron switching tube in series with said second capacitor across said first capacitor, a triode, said triode drawing grid current when the charge on said first storage capacitor is below said second level, means operative when the charge across said first storage capacitor reaches said second level for cutting off the flow of grid current in said triode whereby a sharp positive going wave form appears at the anode of said triode, said wave form serving as the triggering voltage for firing said thyratron whereby the discharge path for said second storage capacitor is completed, and means for providing an indication of the number of times said second storage capacitor discharges during a given time interval.

9. In a system for providing an indication of the dosage of radiation absorbed by an object in a radiant energy environment, a radiation detector positioned in said environment and producing a unidirectional output signal whose amplitude is proportionally related to the instantaneous intensity of the radiation, a first storage capacitor, means for charging said first storage capacitor from a first to a second level at a rate determined by the amplitude of said output signal, said storage capacitor being rapidly discharged back to said first level whenever it attains said second level whereby a saw-tooth wave form occurs across said storage capacitor, said means for rapidly discharging said storage capacitor including a second storage capacitor, means for charging said second storage capacitor to a given level, a thyratron tube, an inductance, said second storage capacitor, thyratron tube and inductance being connected in a series circuit across said first storage capacitor whereby said second storage capacitor discharges into said first storage capacitor to lower the charge thereacross whenever said thyratron is fired, a triode, said triode drawing grid current whenever the charge on said first storage capacitor is below said second level, means for stopping the flow of grid current in said triode when said first storage capacitor is charged to said second level whereby a positive peaked pulse is produced in the anode of said triode, means for coupling said positive peaked pulse to the control grid of said thyratron tube to fire said thyratron and complete the discharge path for said second storage capacitor, the discharge of said second storage capacitor developing an output pulse across said inductance, and means for registering the number of output pulses so produced during a given time.

10. A dosimeter system for indicating the amount of radiation absorbed by an object in a radiant energy environment during a given time, the combination of a detector sensitive to said radiation and adapted to generate a unidirectional output signal whose amplitude is proportional to the instantaneous intensity of the radiation, a first triode, a first resistor and a current meter in series between the cathode of said first triode and a reference potential, a first capacitor, said first capacitor being connected between the anode of said first triode and a potential positive with respect to said reference potential, means for coupling the output signal from said detector to the control grid of said first triode whereby the anode potential of said first triode decreases linearly at a rate determined by the intensity of the radiation being detected, a cathode follower, means for connecting the anode of said first triode to the control grid of said cathode follower, a second triode, said second triode having its control grid coupled to the cathode of said cathode follower so as to draw grid current until the anode potential of said first triode decreases to a given level, a second capacitor, an inductance and a thyratron, said second capacitor, inductance and thyratron being in series across said first capacitor, means for charging said second capacitor to a given level, means for connecting the control grid of said thyratron to the anode of said second triode whereby said thyratron is fired whenever said second triode stops drawing grid current and whereby a discharge path is completed for said second capacitor, said second capacitor increasing the anode potential of said first triode when it discharges whereby said second triode is again biased to draw grid current until the anode potential of said first triode again decreases to said given level, means responsive to each discharge of said second capacitor for generating an output pulse and means for registering the number of pulses so generated within a given time.

References Cited by the Examiner
UNITED STATES PATENTS

| | | | |
|---|---|---|---|
| 2,550,488 | 4/51 | Marsh | 315—134 X |
| 2,833,932 | 5/58 | Constable et al. | 250—83.6 |
| 2,920,208 | 1/60 | Crump | 250—83.6 |
| 2,955,207 | 10/60 | Pearson | 250—83.6 |
| 2,995,679 | 8/61 | Skoyles | 328—181 X |
| 3,093,738 | 6/63 | Mann et al. | 250—83.6 |
| 3,126,511 | 3/64 | Redemske et al. | 324—33 |

RALPH G. NILSON, *Primary Examiner.*

ARCHIE R. BORCHELT, *Examiner.*